J. J. R. HAALCK.
BOAT TRANSPORTING APPARATUS.
APPLICATION FILED MAR. 24, 1920.

1,373,327.

Patented Mar. 29, 1921.
5 SHEETS—SHEET 1.

Inventor
J. J. R. Haalck,
By Watson E. Coleman
Attorney

J. J. R. HAALCK.
BOAT TRANSPORTING APPARATUS.
APPLICATION FILED MAR. 24, 1920.

1,373,327.

Patented Mar. 29, 1921.
5 SHEETS—SHEET 5.

Inventor
J.J.R.Haalck,

By Watson E. Coleman
Attorney

UNITED STATES PATENT OFFICE.

JOHANN J. R. HAALCK, OF BAKERSFIELD, CALIFORNIA.

BOAT-TRANSPORTING APPARATUS.

1,373,327.　　　　　　Specification of Letters Patent.　　Patented Mar. 29, 1921.

Application filed March 24, 1920. Serial No. 368,405.

*To all whom it may concern:*

Be it known that I, JOHANN JURGEN RICHARD HAALCK, a citizen of Germany, (who has declared his intention to become a citizen of the United States,) residing at Bakersfield, in the county of Kern and State of California, have invented certain new and useful Improvements in Boat-Transporting Apparatus, of which the following is a specification, reference being had to the accompanying drawings.

This invention relates to means for transporting boats of the general character of the apparatus illustrated in my previous Patents, #1,259,620 of March 19, 1918, #1,259,619 of March 19, 1918, and #1,283,744 of November 5, 1918.

More particularly this apparatus is designed for transporting boats from a river or a relatively low body of water to a canal or other body of water at a higher altitude, or transporting a boat from a body of water at a relatively high altitude to a body of water at a relatively low altitude.

The general object of this invention is to provide means whereby a boat may be readily transported from one body of water to another at a different altitude so as to permit the boat to be transported across mountain ranges.

And a further object is to provide a mechanism of this character which is particularly designed to be used in connection with a series of canals at different levels, the canals being closed so that they may be filled with water impregnated with salt, thus keeping the canals open when the temperature is relatively low and permitting, therefore, the navigation of the canals during the winter months, thus permitting a twelve months' navigable season and a full use of all traffic equipment and thus eliminating the necessity of canal transportation lying dormant throughout the winter months.

More specifically my object is to provide a structure operating on an inclined rail bed and movable into the water of a relatively low river or canal at the base of said rail bed, movable over the rails to a higher level and into the water of a second canal or waterway at a higher level, this structure including a traveling crane and hoisting means whereby the boat or vessel may be connected to the traveling crane and lifted from the water as the traveling crane moves upward, or deposited on the water as the traveling crane moves downward into the lower canal.

A further object is to provide a structure of this kind which is so arranged that vessels of different lengths may be readily accommodated and lifted without any change in the structure.

Still another object is to provide means for supporting the vessel in a suspended position within the crane, completely under the control of the crane operator, and provide a hauling cable whereby the crane may be hauled up the inclined railway or lowered down the railway, this being under the control of a separate operator.

A further object is to provide means at the upper end of the inclined railway whereby the vessel may be shifted at right angles and carried into the water of the canal, this mechanism for turning the boat and carrying it into the upper canal or carrying a boat from the upper canal to the beginning of the inclined railway being under the control of the same operator who controls the operation of the traction cables.

Other objects have to do with the means whereby the crane or derrick is constructed so as to accommodate boats of different lengths or tonnage, with the means for operating the various instrumentalities on the derrick or crane, with the detailed construction of the crane and the cableway, and the structure of the hoisting means at the upper end of the cableway, and the means for carrying the boat from the upper end of the cableway into an upper canal or carrying the boat from the upper canal to the beginning of the cableway.

Other objects will appear in the course of the following description.

My invention is illustrated in the accompanying drawings, wherein:—

Figure 1:
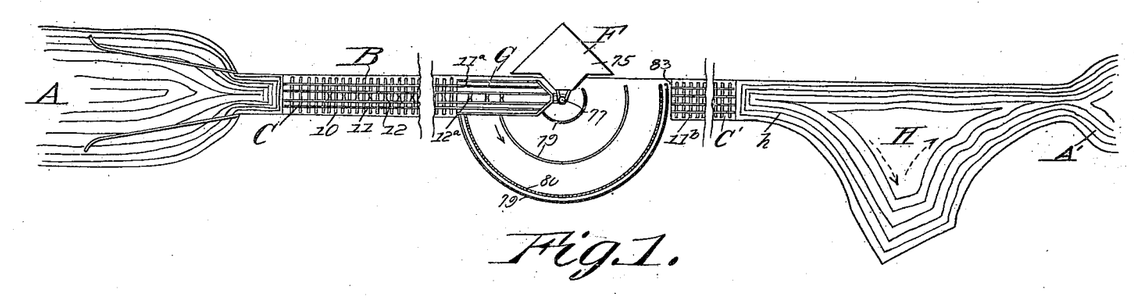
Figure 1 is a top plan view of a boat lifting and transporting system constructed in accordance with my invention.

In Fig. 1, I have indicated by the letter A a river, canal, lake or other body of water, and by the letter B a hillside extending upward from the margin of the body of water A and upon which is erected a cableway, as will be later described. Adjacent the shore of the body of water and the hillside, the bed of the river is deepened, as at C, to form a basin, the walls of which are preferably of concrete or like material, and the bottom of this basin extends up the hillside at an even and regular pitch. Upon the bottom of the basin thus formed and up the side of the hill, are disposed the ties 10 upon which the rails 11 are mounted. Disposed between the rails are flanged rollers 12 mounted in suitable supporting brackets 13, and over these rollers operate one or more cables 14 which are connected to the movable derrick.

Figures 3, 4, 11:
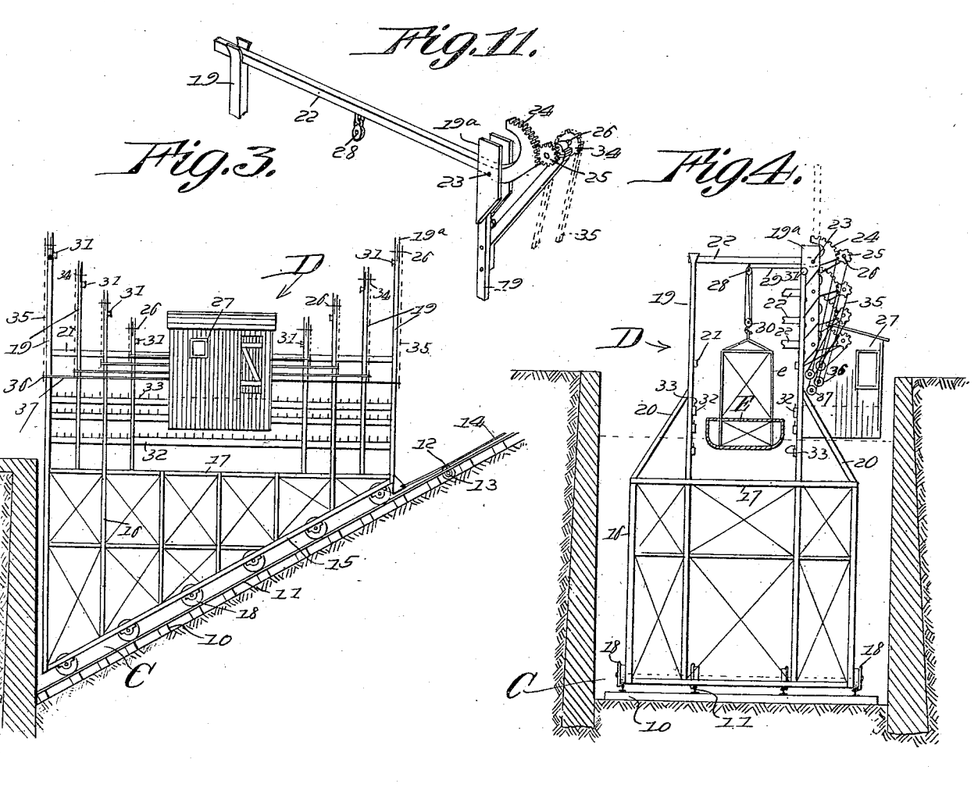
Fig. 3 is an enlarged sectional view of the lower basin of the system and a side elevation of the lifting derrick or structure.
Fig. 4 is a transverse section of the basin C as shown in front elevation of the lifting structure.
Fig. 11 is a perspective view of one of the supporting beams 22 and its mounting.

The derrick, which is designated generally D, is a skeletonic structure formed of steel beams with suitable cross ties, and including sills 15 disposed at the same angle as the angle of the cable roadway and vertical members 16 extending upward from these sills and connected by suitable longitudinally extending beams 17. Wheels 18 are mounted on these beams, these wheels engaging with the rails 11 and being of such character as to prevent the wheels from running off the rails. Thus they may be single flanged wheels. Carried upon the upper longitudinal beam 17 are a series of vertically extending girders 19. The outermost girders are relatively tall, the next girders are slightly shorter, the next girders are still shorter, and those girders or standards which are nearest to the middle of the structure are still shorter. Each of these girders 19 is suitably braced from the substructure, as by braces 20, and the various girders 19 may be connected by longitudinal braces 21 of any suitable character so that these girders are supported very rigidly. All of the girders 19 on one side of the structure, as illustrated in Fig. 4, have attached at their upper ends the plates 19ᵃ and between these plates is pivoted a cross beam or supporting beam 22, the pivot being designated 23. The free end of each cross beam is adapted to rest in its corresponding girder on the opposite side, and to this end the girder 19 on the opposite side is formed at its upper end with a socket to receive the free end of the corresponding cross beam 22. I have shown eight pairs of uprights 19, and hence it will be understood that there are eight of these pivoted cross beams or supporting beams 22. Each supporting beam 22 at its pivotal end is formed with a sector gear 24, and a gear wheel 25 meshes with each of these sector gears 24, these gear wheels 25 being mounted on a shaft 26 supported in any suitable manner on the frame of the derrick or upon the house 27 in a manner which will be later stated. Each of these supporting beams 22 carries upon it a block 28 or equivalent element, and from this block extends a cable 29 passing through a sheave 30, back over the block 28, and then extending over a pulley 31 to a suitable winding apparatus. The hook carried by the sheave 30 is intended to be engaged with a supporting superstructure on the vessel, as indicated in Fig. 4, and this cable 29 with its blocks and tackle forms supporting means for the vessel E. Longitudinally extending planks 32 are attached to the uprights or girders 19 and act as shields preventing the vessel from striking against the girders, and certain of these planks are provided with upwardly extending pins 33 whereby the boat may be held in place by means of cables or ropes extending from the boat around these pins.

It will be understood that the supporting beams 22 operate in pairs, and that where a large vessel, that is a long vessel is to be supported by the derrick, the beams 22 of the outermost uprights 19 are to be used, and where a smaller vessel is carried, the beams 22 of the next inner pair of uprights 19 are to be used, and so on until the inner pair of supporting beams 22 are used for the smallest vessel for which the derrick is designed. Thus each vessel will be supported by two cables and the appropriate blocks, these cables and blocks being supported on the beams 22 corresponding to the size of the vessel. Of course, all of the uprights or girders 19 might be made of the same length, but this would be a waste of material and work, inasmuch as the shorter uprights are designed to be used for small vessels, the next higher for large vessels, and so on. It is to permit the vessel to move into place between the series of uprights 19 when the derrick is in its fully lowered position in the basin C that the cross beams or supporting beams 22 are pivoted so that they may be raised and lowered. Thus, it is obvious that with a relatively large vessel it will be necessary to raise all of the cross beams 22, except with the possible exception of that pair of cross beams which is designed to support that particular vessel. This is particularly true, of course, where the vessel is provided with masts or with upper works which extend a considerable distance above the hull of the vessel. These cross beams 22 will be raised, the vessel will move into the space between the uprights 19, then the cross beams will be lowered, and the lifting tackle connected to the superstructure $e$ of the vessel. These vessels or boats will be built on the bridge principle, that is they are so built that they may be lifted by the application of power at two points in the vessel without the vessel breaking under the strain, and it is obvious that the boats or vessels will be standardized and will be provided with suitable superstructure $e$ with which the hooks on the blocks 30 may be engaged.

The means for raising or lowering the supporting beams 22 and for operating the lifting and supporting cables are disposed within the house 27 which is formed as a part of the derrick. Each shaft 26 has a gear wheel 25 adapted to engage with the corresponding sector gear 24, and each shaft carries a sprocket wheel 34 over which runs a sprocket chain 35 extending downward into the house 27 and passing over a sprocket wheel 36 mounted upon a longitudinally extending shaft 37. There is thus one shaft 37 for each pair of sprocket wheels 34. This shaft 37 carries upon it a sprocket wheel 38. (See Fig. 7.) There are four shafts 37 corresponding, therefore, to the four pairs of beams 22. Disposed within the house is a power driven main shaft 39 which carries upon it a plurality of loose sprocket gear wheels 40, over which sprocket chains 41 pass to the several sprocket wheels 38, and mounted upon the shaft 39 and splined thereto for rotation therewith but longitudinally shiftable thereon are the clutch elements 42 which are adapted to engage with like clutch elements on the sprocket wheels 40. Each of these clutch elements 42 is independently shiftable into and out of engagement with its corresponding clutch element on the corresponding sprocket wheel 40 by means of the levers 43. Mounted on the shaft 39 is a beveled gear wheel 44 whereby power is transmitted to this shaft.

It will thus be obvious that when any one clutch element 42 is engaged with the corresponding clutch element on the corresponding sprocket wheel 40, that power will be transmitted to the corresponding shaft 37 and thus to the corresponding gear wheels 25 and thus to the sector gears 24 to oscillate the arms 22 to thus cause the supporting beams 22 to be raised or lowered, depending upon the direction in which the main shaft 39 is caused to revolve. It will, of course, be obvious that only one of these shafts 37 is operated at one time. The remaining beams 22 will be held in a raised position or inoperative while one pair of beams is being raised or lowered.

The means for operating the cables 29 is as follows: Within the engine room 27 there is mounted a driving shaft 45 carrying upon it four relatively loose spur gear wheels 46, these spur gear wheels meshing with spur gear wheels 47 each mounted in connection with a drum 48. There are four pairs of these drums, one set of drums being arranged on one side of the shaft 36 and the other on the opposite side of the shaft 36 so that each spur gear 46 drives one pair of drums 47. On these drums 47, the cables 29 are wound, these cables passing over pulleys 49 in the wall of the house, and then passing over the respective pulleys 31 to the blocks mounted on the beams 22. Each of the spur gears 46 is formed with a clutch element 50, and coacting with each of these clutch elements is a clutch element 51 splined upon the shaft 36 and manually shiftable into or out of engagement with its corresponding clutch element 50. By manually shifting these clutch elements 50 by means of suitable levers 52, any pair of winding drums may be connected to the driving shaft 36, and it will be obvious from Fig. 7 that as one pair of cables 29 are wound around their corresponding drums in opposite directions, that a rotation of these drums in opposite directions will cause the winding up of both cables of the pair or the letting out of both cables of the pair. The clutch faces of the clutching elements 50 and 51 are so constructed that when the clutch elements are shifted into engagement with each other that no strain can come on the lever which shifts the gears, but that the strain will be fully supported by the engaging teeth of the clutch elements. Of course, it will be obvious that these gears and the clutch elements will have to be relatively heavy and strong, as the cables will have to support a weight of from 500 to 1000 tons. The shaft 45 receives its power from a shaft 53 carrying on it the relatively large and powerful gear wheel 54, and engaged with the shaft 45 by an automatic friction block 55 whose construction will be hereafter described.

The gear wheel 54 is driven, as will be now explained, and this gear wheel 54 is of such size that it will extend several inches through the floor of the house 27. Disposed within the house 27 is a driving shaft 56, and extending parallel thereto is a counter shaft 57 which carries upon it a belt wheel 58, from which passes a belt 59 to the belt wheel 60 of a motor 61. Mounted upon the shaft 57 is a loose gear wheel 62 having a clutch element on one face and a sprocket wheel 63 having a clutch element on one face, and disposed between these two clutch elements is a sliding double clutch element 64 which is splined to the shaft 57 for rotation therewith but may slide from a neutral position into engagement with either one of the clutch elements on the gear wheel 62 or the sprocket wheel 63 respectively. This clutch element 64 is shifted by means of a lever 65. Mounted on the shaft 56 is a sprocket wheel 66 having a sprocket chain passing over a sprocket wheel 63, and the gear wheel 62 engages with a gear wheel 67 on shaft 56.

It will be obvious now that a shifting of the double clutch element 64 will cause either the sprocket wheel 63 or the gear wheel 62 to be driven, and that thus the shaft 56 will be driven in one direction or the other, depending upon which element the clutch 64 is engaged with. Mounted on the shaft 56 is a loose gear wheel 68 which engages with the gear wheel 54 and has a clutch element on one face, and coacting with this clutch element is a sliding clutch element 69 operated by a lever 70 and splined for rotation on the shaft 56. When this clutch element is out of engagement with the clutch element on gear 68 no power will be communicated to the drive wheel 54 or to the shafts 53 and 45, and on the other hand when the clutch element 69 is engaged with the gear wheel 68, power will be so communicated to drive the winding drums 48. Also mounted on the shaft 56 is a loose beveled gear wheel 71 engaging with a beveled gear wheel 72 carried by a shaft 73, this shaft carrying a beveled gear wheel 74, which in turn engages with the beveled gear wheel 44 on shaft 40, and thus power may be communicated to the shafts 37 which operate the sector gears 24 to raise or lower the supporting beams 22. It will be understood that the levers 52 for operating the drum gears extend through the floor of the house and that the levers 43 also extend through the floor of the house so that one man may control all of these levers, these levers being so shaped that the handles of the levers will be placed in convenient relation so that one operator may readily control all of the levers.

While I have illustrated a particular manner of gearing the drum shaft 45 to the motor 61 and gearing the shaft 39 to the motor, I do not wish to be limited to this particular arrangement, except in so far as I may be limited by the scope of the appended claims, as it is obvious that other forms of gearing may be used and that the gearing may be made so as to give a relatively slow speed to the winding shaft and the shaft 40 with a relatively great power, nor do I wish to be limited to the particular form of motor shown, and it is obvious that two or more motors might be used instead of the one motor illustrated.

It will be understood that the boats E are to be built, as before stated, on the bridge principle, and thus there are on each boat two points where it may be supported. It is for this reason that for each size of boat there are two supporting beams 22 working in unison and two cables, and each pair of supporting beams and each pair of cables 29 must work independently from the other supporting beams and other cables. For illustration I will suppose that the transporter or derrick structure is built for four sizes of boats E, these boats being respectively 30, 40, 50 and 60 feet long between the points of attachment of the cables, though the hulls of the boats may be considerably longer than the points of attachment. Thus, where the points of suspension are spaced 60' from each other, they may extend 20' or more at either end, thus making the entire length of the boat 100', and the same rule may apply to boats in which the supporting points are spaced 30' or 40' from each other. It will be understood that this is purely illustrative and the transporting derrick might be made to accommodate boats of much larger sizes, and that I do not wish to be limited to the use of merely a pair of supporting beams 22 and that it is within my invention to have all of the supporting girders 19 of the same height and use all of the supporting beams 22 with their cables 29 for the heavy boats, though I consider it only a waste of material and an additionally useless dead weight to build the supporting girders 19 all of the same height. It will, of course, be understood that breaks or other supporting means will have to be provided for holding the shaft 45 and the shafts 37 in their supporting positions and under load.

Figure 5:
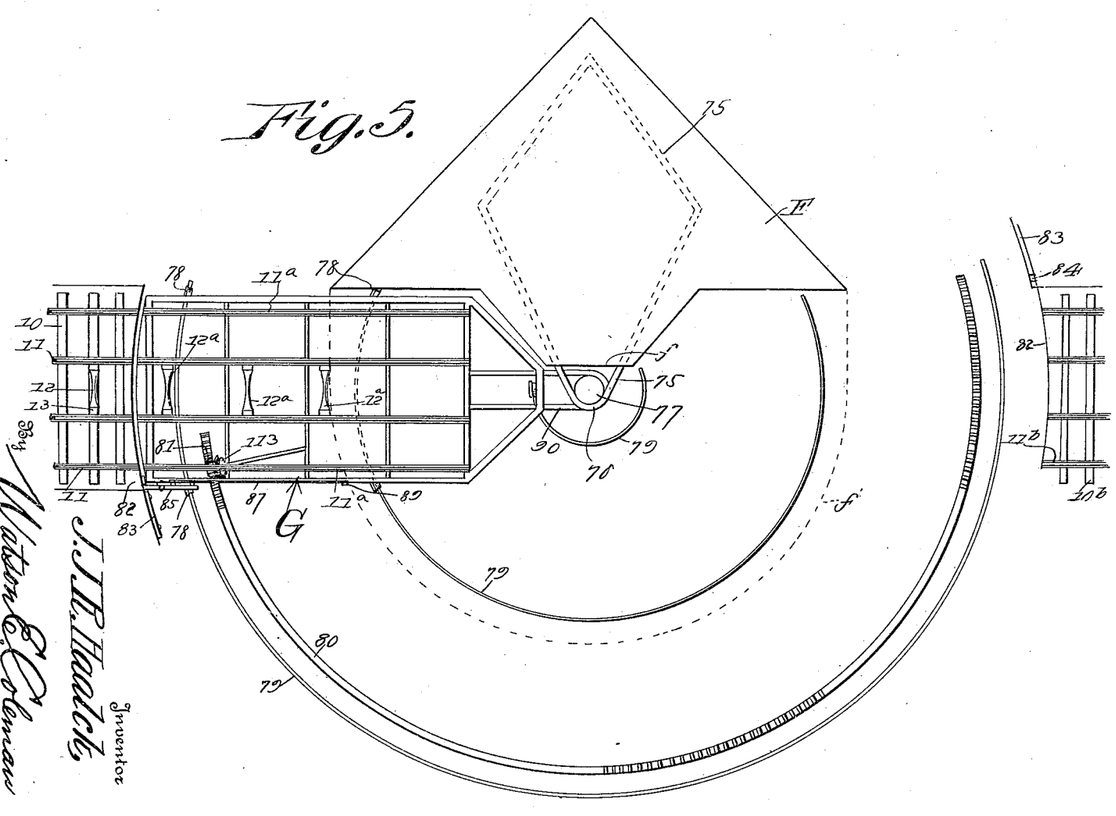
Fig. 5 is a top plan view of the receiving and transferring structure.
Figures 6, 10:
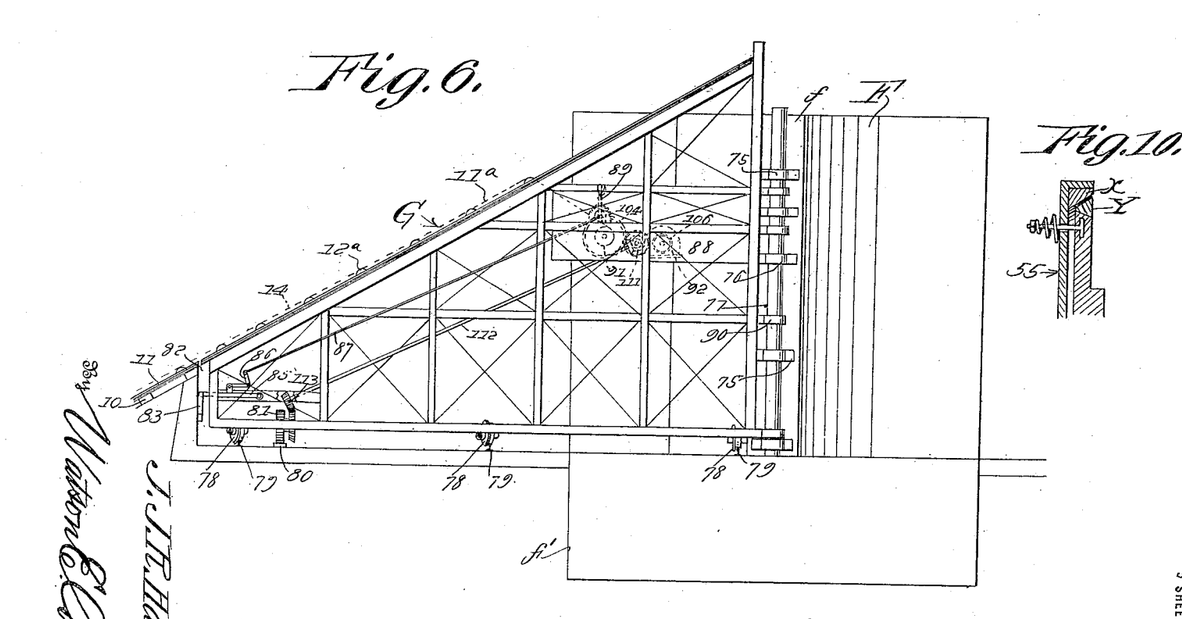
Fig. 6 is a front elevation of the receiving and transferring structure.
Fig. 10 is a sectional view through one of the automatic blocks.

In Fig. 3 I have illustrated the lower end of the upwardly inclined cableway, and in Fig. 6 I illustrate the upper end thereof and the means whereby the boat is turned about and carried to the upper basin or canal. In order to support the structure which forms the upper section of the trackway or cableway and which acts to carry the vessel from the cableway into the upper basin, I provide a very heavy and solid pier F of concrete or masonry, which extends downward into the earth a considerable distance and which may be approximately triangular in form, with a central, projecting portion $f$. The base of this pier extends in front of the pier, as shown in dotted lines in Fig. 5, at $f'$. Embedded in the pier at a plurality of points are the heavy metallic bars 75 which extend out upon the face of the truncated portion $f$ and are bent to form yokes 76 within which is disposed the upwardly extending pintle 77 which is made of a heavy bar of steel or like material. Hingedly connected to this pintle is a skeletonic supporting structure, designated generally G, and formed of vertical, horizontal, and transverse members with supporting tie rods, the lower portion of this structure being horizontal and the upper portion being upwardly inclined at the same angle as the trackway and carrying thereon the tracks 11ª forming continuations of the tracks 11 and also carrying thereon the rollers 12ª which are of the same character as the rollers 12. This structure G is designed to swing to a half circle and the base of the structure is supported by wheels 78 moving on arcuate tracks 79. An arcuate track 80 is formed with rack teeth and engaged by a gear wheel 81 mounted upon a suitable shaft carried at the base of the structure. The wall 82 which forms the upper end of the lower section of the inclined trackway is provided with a keeper 83 whose upper face is inclined and which has a notch 84, and pivotally mounted upon the structure G at its free end is a latch 85 adapted to drop into the notch 84 and thus lock the structure G with its tracks 11ª in alinement with the tracks 11 of the upwardly inclined trackway. This latch is operatively connected to a bell crank lever 86, which in turn is connected to an operating rod 87 extending up into the house 88 and connected to a lever 89.

As the structure G swings around into alinement with the trackway, this latch 85 will ride up the inclined face of the keeper 83 and drop automatically into the notch 85, but when the derrick structure D rests fully upon the swinging structure G, then the operator lifts this latch 85 and by means of the driving gears hereafter described rotates the structure G upon its hinge from its receiving position to its discharge position. This structure G is held to the pintle 77 by means of U-shaped yoke bars 90.

Figures 7, 8, 9:
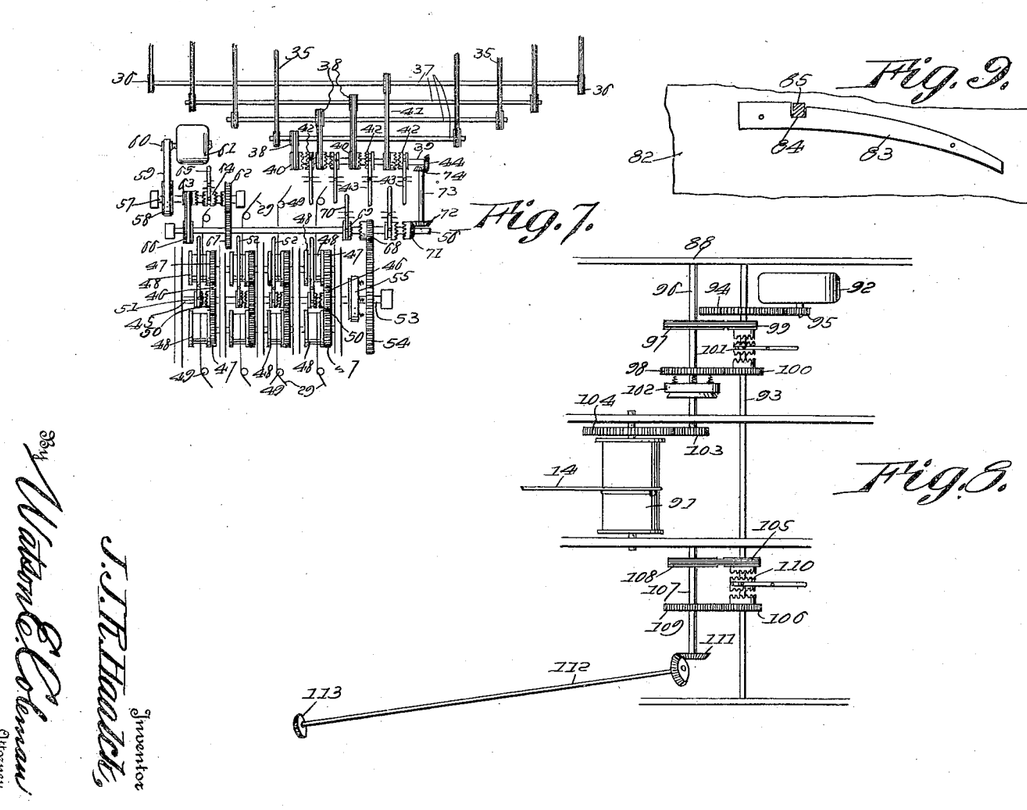
Fig. 7 is a diagrammatic plan view of the mechanism for operating the supporting beams of the derrick and the winding drum of the derrick.
Fig. 8 is a diagrammatic top plan view of the mechanism on the receiving and transferring structure to operate the derrick lifting cable and the mechanism for oscillating the receiving and transferring structure.
Fig. 9 is a fragmentary side elevation of one wall of the receiving basin showing the latching means in section.

The cable 14 extends up into the house 88 and is there connected to a winding drum 91, as illustrated in Fig. 8. Disposed within the house 88 is a motor 92, and mounted upon a driving shaft 93 is a gear wheel 94 which gears with the gear wheel 95 on the motor shaft. Extending parallel to the shaft 93 is a countershaft 96 carrying upon it the sprocket wheel 97 and the gear wheel 98. Loosely mounted on the shaft 93 is a sprocket wheel 99 and a gear wheel 100, and operating between the two is a double clutch 101 adapted to be manually shifted from a neutral position into engagement with either one of the wheels 99 or 100, and thus the shaft 96 may be rotated in either direction. The shaft 96 extends into an automatic block 102, whose construction will be later described, which operates a gear wheel 103, which in turn engages with a gear wheel 104 mounted on the shaft of the drum 91. Thus power may be communicated to the drum 91 to rotate it in either direction, to either wind up the cable 14 or unwind it.

For the purpose of rotating the gear wheel 81 which swings the structure G in one direction or the other, I mount upon the shaft 93 a sprocket wheel 105 and the gear wheel 106, and mount upon the countershaft 107 a sprocket wheel 108 and the gear wheel 109. The sprocket wheel 108 is connected by a chain to the sprocket wheel 105. The gear wheel 109 meshes with the gear wheel 106. The wheels 105 and 106 are provided on their confronting faces with clutch elements, and disposed between the clutch elements is a double clutch 110 shiftable to engage either of these wheels 105 or 106 with the shaft 93 and thus to rotate the shaft 107 in either direction. This shaft 107 carries upon it a beveled gear wheel 111 which engages with a beveled gear wheel on the shaft 112. This shaft 112 extends downwardly and outwardly, and at its lower end carries a gear wheel meshing with the gear wheel 113 which is mounted upon the shaft supporting the gear wheel 81. It will thus be seen that the lifting or lowering of the derrick structure and the swinging of the structure G in either direction is entirely controlled by the operator within the house 88.

In Fig. 1, as indicated, the receiving basin or canal C', the bottom of which is downwardly inclined at the same pitch as the downwardly inclined bottom of the canal C, is provided with the rails 11ᵇ which are adapted to aline with the rails 11ª when the swinging structure G is shifted through half a circle, these rails being supported upon ties in the usual manner and extending down to the bottom of the receiving basin C'. This receiving basin is, of course, deep enough at its lowest point so that when the derrick D moves into this receiving basin, the vessel or boat will come to rest on the surface of the water. Thus this vessel or boat, when it is released from the derrick, moves out of the derrick and into a passageway h leading into a basin H which is sufficiently large to permit the boat to be turned around, that is the boat enters the derrick D from the lower level with its bow pointing toward the rear of the derrick structure D. When this derrick structure D is turned through a half circle, it is obvious that the boat will have to pass out of the derrick structure stern foremost. It passes out through the passageway h, then into the receiving basin H, where it is turned, as indicated by the arrows, and eventually passes out into the canal or river A'.

The automatic block referred to as being used in connection with the winding mechanism for the transporting derrick and the transferring structure is the same as that used in connection with large winding drums, and constitutes in effect a frictional clutch whose two elements move together under ordinary strain, but give when a breaking strain is applied to the mechanism so as to prevent breakage of the parts. Such a friction clutch is illustrated in Fig. 10 and consists of the two parts X and Y of wood or like material, mounted to rotate around a common shaft and having frictional engagement with each other.

Figure 2:
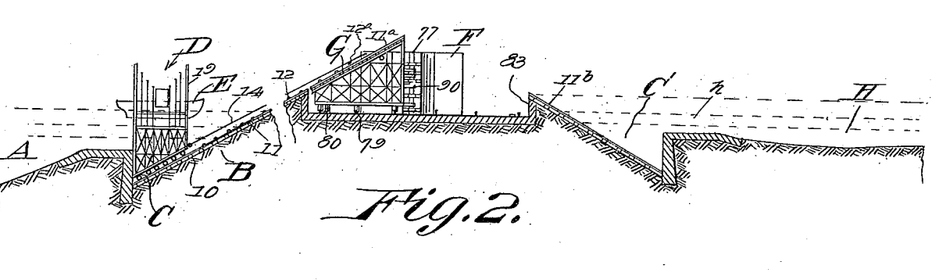
Fig. 2, is a diagrammatic longitudinal section through the canals, basins and the lifting mechanism of the system.

In the operation of this mechanism, when it is desired to raise a boat from a lower level to a higher level, that is from the canal or river A to the canal or river A', the derrick D is lowered to such a point that the beams 17 are, say five feet under water. The degree to which the derrick D is lowered in the basin C will depend upon the level of the water, and the basin C is to be of such size that when the water is low the derrick may be lowered to its full extent to bring the beam 17 beneath the surface of the water, and when the water is high the derrick D will only be partially lowered in the basin C, as illustrated in Fig. 2. The supporting beams 22 are then all raised so that the vessel may pass under its own power, or by towing, or other means, into the space between the uprights 19 and into an approximate position where it may be properly raised. The operator judges of the size of the boat and thus judges as to which supporting beams 22 are to be lowered, and lowers these supporting beams by actuating the proper lever 43. When the proper supporting beams 22 are lowered, he then unwinds two of the cables 29 from their corresponding drums, the particular cables to be unwound and the particular drums to be actuated depending upon the size of the vessel and the particular supporting beams 22 which have been lowered, and lowers the proper blocks 30. The hooks on these blocks are then engaged with the superstructure of the vessel or with any eyes, hooks or other appliances on the vessel designed for this service, and then the operator winds up on the proper drums 48 until the cables 29 are tightened. This warps the vessel into place with the hooks on the blocks 30 immediately beneath the proper beams 22. This is necessary for the reason that it will be comparatively seldom that a boat or vessel under its own power can be maneuvered into a position bringing it in proper relation to the supporting beams 22 to be used therewith. The cables 29 are tightened by winding up on the proper drums 48, and then the shaft 45 and the drums are held from rotation by means of the automatic block mechanism 35.

It will be understood that the vessel is not lifted from the water but the slack in the cables 29 is simply taken up until the cables are taut. When this has been accomplished, the operator in the house 27 gives a signal to the operator in the house 88, and the operator connects the winding drum 91 to the source of power by the mechanism heretofore described and the cable 14 commences to wind up on the drum 91, drawing the transporting derrick upward on the rails 11. When the transporting derrick has reached the swinging frame G and is resting entirely on the rails 11ª, the operator in the engine house 88 of the structure G releases the latch 85 and shifts the swinging structure around on the tracks 79 by connecting the gear wheel 81 with the driving mechanism through the instrumentalities of the mechanism heretofore described. This causes the structure G to swing around through a half circle so that the inclined tracks 11ª are in alinement with the inclined tracks 11ᵇ of the basin C'. The operator in house 88 then releases the automatic block 87 which has been holding the drum 91 from unwinding, and by the reversing gears illustrated in Fig. 6 and heretofore described permits the derrick structure to move down into the basin C' on the tracks 11ᵇ until the vessel is once more resting on the water in the basin C'. Then the cables 29 are slackened by the mechanism heretofore described and controlled by the operator in the engine house 27 and the blocks 30 released from engagement with the superstructure of the vessel E, and the vessel E then backs out between the uprights 19 into the passageway h and then into the basin h', where it turns and proceeds on its way into the canal or river A'. Of course, while the transporter derrick D is opposite the rails 11 of the basin C', a vessel may pass from the basin C' onto the swinging structure G and thus be carried around so as to bring the transporting derrick into place above the rails 11, and then the transporting derrick be lowered into the basin C and the vessel thus carried from the basin C' to the basin C, and thence into the river or canal A. Thus, the mechanism may be used either for transferring vessels from a high body of water to a relatively lower body of water, or from a low body of water to a relatively higher body of water.

The advantages of the mechanism before described will be evident. Electric power may be used for operating the motors in the two engine houses, and this might be water power generated by water passing from a high level river or canal to a low level river or canal, and thus materially reduce the cost of running mechanism of this kind. By means of this mechanism, vessels may be readily transported from low to high levels, and vice versa, so that the vessels might pass over a series of ridges or mountains separating two streams of water, or it might be used in connection with rivers which are navigable for vessels for a certain distance and then the mechanism could be used to transfer these vessels to a canal system whereby the vessels could leave the river and be transported by canal to any desired place. As before stated, the use of this apparatus would permit canals to be used without locks so that the canals could be closed and kept filled with salt water so that they would not freeze but remain open for the entire year or the greater part thereof.

This mechanism will do away with the necessity of locks which are impractical where the grade is very steep, and by this means vessels could easily pass dams or like obstructions. Of course, if all of the vessels or boats designed to be transported were of one standard size, only one set of supporting beams 22 would be used and all of these supporting beams would be raised or lowered, and only one set of cables 29 would be used, but where boats of different sizes are to be supported, it is obvious that cables of different sizes would be used for the different boats, and that the point of application of these cables to the boats would vary so that it would be necessary to have a plurality of sets of supporting beams and a plurality of sets of cables and winding drums.

While I have illustrated a particular form of my invention, I do not wish to be limited thereto, as it is obvious that many changes might be made in the details of construction and arrangement of parts without departing from the spirit of the invention.

I claim:—

1. Means for transferring a boat from one body of water to another at a different level including an inclined track structure dipping into the lower body of water and extending upward to a point adjacent the level of the upper body of water, a second track structure extending downward and dipping into the second body of water, a boat supporting structure operating on said track structure, a boat transfer structure, means whereby the said boat transfer structure may coact with the upper ends of the track structures, and means carried by the transfer structure adapted to raise the traveling structure or lower the same on said track structures.

2. Means for transferring a boat from one body of water to another body of water at a different level including an inclined track structure extending continuously from a point adjacent the level of the upper body of water to the lower and extending into the lower body of water, a second track structure extending downward from said upper level at an inclination into the upper body of water, a traveling boat supporting structure movable on the track structures, the lower portion of said boat supporting structure having the same inclination as the inclination of the track structures to travel thereon and being disposed at all times in a plane inclined to the horizontal, boat supporting means carried by the upper portion of said traveling structure, means for propelling the traveling structure up and down the track structures, and means for transferring the supporting structures from the upper end of the first track structure to the upper end of the second track structure or vice versa and simultaneously turning the boat supporting structure end for end.

3. Means for transferring a boat from one body of water at one level to another body at a different level including an inclined track structure extending from a level slightly above the level of the upper body of water and extending into the lower body of water, a second track structure extending from a level with the upper end of the first track structure downward at an inclination into the upper body of water, a transferring structure supported on the upper level, means whereby the transferring structure may be shifted from a position of alinement with the upper end of one track structure into alinement with the upper end of the other track structure and said transfer structure carrying a track disposed at the same inclination as the inclination of said first named track structure, and a traveling supporting structure movable on the track structures in either direction, the lower portion of said supporting structure having the same inclination as the inclination of the track to travel thereon and disposed at all times in a plane inclined to the horizontal, boat supporting means carried by the upper portion of said traveling structure, and means mounted on the transfer structure for drawing the traveling structure upward on either one of said track structures to the transfer structure and downward on either one of said track structures.

4. Means for transferring a boat from one body of water to another at a different level including an inclined track extending from a point adjacent the water at the upper level downward into the lower body of water, an inclined track extending into the upper body of water and having its upper end terminating on a level with the upper end of the first named inclined track, a traveling boat supporting structure adapted to move over said tracks, a transfer structure pivotally mounted upon said upper level and having tracks adapted to receive the traveling structure from the first named tracks or from the second named tracks, means on said transfer structure for rotating the transfer structure on its axis to carry the traveling structure from one track to the other, a power operated winding drum mounted on the transfer structure, and a cable on the winding drum engaged with the traveling structure.

5. Means for transferring a boat from one body of water to another at a different level including a track extending downward from a point adjacent the water at the upper level and into the lower body of water, a track extending downward into the upper body of water, a circular track on said upper level but located below the level of the upper ends of the first and second named tracks, a pier on said upper level, a transferring structure swingingly connected to said pier for movement therearound and having wheels engaging the third named tracks, said transfer structure having upwardly inclined tracks adapted to register in one position with the first named tracks and in another position with the second named tracks, power operated means for swinging said transfer structure on its tracks, a power operated drum on the transfer structure, and a cable wound on said drum and connected to the traveling structure whereby the traveling structure may be drawn onto the transfer structure and the transfer structure swung to carry the traveling structure into alinement with either of said tracks and the traveling structure allowed to travel upon either of said tracks.

6. A boat transporting apparatus including a traveling supporting structure having a series of uprights on each side of the structure disposed opposite to each other, supporting beams swingingly connected to the uprights on one side of the structure and normally having their free ends supported by the uprights on the opposite side of the structure, boat suspending cables supported by said pivoted beams, and means for tightening up or slackening the supporting cable.

7. A transporting apparatus including a traveling supporting structure having a series of uprights on each side of the structure adapted to receive a boat between them, the uprights at opposite ends of the structure being relatively high, the uprights inward from said end uprights gradually decreasing in height from the ends, the uprights being thereby arranged in pairs, the middle pair of uprights being of the same height, transverse supporting beams normally extending between said uprights, elevating cables supported by said beams, and means for simultaneously raising or lowering the cables running to corresponding transverse beams in unison.

8. A transporting apparatus including a traveling supporting structure adapted to receive a boat, sets of elevating cables mounted upon the supporting structure to engage boats of different lengths, and means for simultaneously operating the cables of each set independently of the cables of any other set.

9. A transporting apparatus including a traveling supporting structure having oppositely disposed uprights between which the body to be transported is received, a supporting beam pivotally mounted between one of said uprights and normally resting at its free end upon the upper end of the oppositely disposed upright, the pivotal end of said supporting beam having a sector gear, a gear wheel meshing with said sector gear whereby the supporting beam may be raised or lowered, and manually controlled, power operated means carried by said traveling structure for operating said gear wheel and including means whereby the direction of motion of the gear wheel may be reversed.

10. A transporting apparatus including a traveling supporting structure having laterally spaced uprights between which the body to be supported is adapted to be disposed, a supporting beam pivoted to one of said uprights and normally resting upon the other end of the opposite upright, a pulley connected to the supporting beam, a cable connected to the supporting beam at one end and passing over said pulley, a block supported in the bight of said cable and adapted to engage with said body, manually controlled, power operated means for oscillating the supporting beam, and power operated, manually controlled means for winding up said cable or paying it out.

11. In a transporting apparatus, a traveling supporting structure having two pairs of laterally spaced uprights adapted to receive between them a body to be supported, a supporting beam pivoted to an upright of each pair and adapted to be swung to a horizontal position and rest upon the upper end of the opposite upright of the other pair, pulleys carried by said supporting beams, cables passing over said pulleys and adapted to be engaged at two points with the object to be supported, manually controlled, power operated means for oscillating said supporting beams, and manually controlled, power operated means for winding up or paying out said cables simultaneously.

12. In a transporting apparatus, a traveling supporting structure having two pairs of laterally spaced uprights adapted to receive between them a body to be supported, a supporting beam pivoted to an upright of each pair and adapted to be swung to a horizontal position and rest upon the upper end of the opposite upright of the other pair, pulleys carried by said supporting beams, cables passing over said pulleys and adapted to be engaged at two points with the object to be supported, manually controlled, power operated means for oscillating said supporting beams, manually controlled, power operated means for winding up or paying out said cables simultaneously, and including a driving shaft, a pair of drums to which the cables run and having gear wheels, a gear wheel loosely mounted on the driving shaft and meshing with the gear wheels of the drums, and clutch mechanism whereby the loose gear wheel may be engaged with the shaft or disengaged therefrom.

13. In a transporting apparatus, a traveling supporting structure having two pairs of laterally spaced uprights adapted to receive between them a body to be supported, a supporting beam pivoted to an upright of each pair and adapted to be swung to a horizontal position and rest upon the upper end of the opposite upright of the other pair, pulleys carried by said supporting beams, cables passing over said pulleys and adapted to be engaged at two points with the object to be supported, manually controlled, power operated means for oscillating said supporting beams, manually controlled, power operated means for winding up or paying out said cables simultaneously, and including a driving shaft, a pair of drums to which the cables run and having gear wheels, a gear wheel loosely mounted on the driving shaft and meshing with the gear wheels of the drums, clutch mechanism whereby the loose gear wheel may be engaged with the shaft or disengaged therefrom, a motor, and means for operatively connecting the motor to the shaft to drive the shaft in one direction or the other.

14. In a transporting apparatus, a traveling supporting structure having oppositely disposed uprights, a supporting arm pivotally connected to one of said uprights and normally extending horizontally over to and resting upon the upper end of the other upright, said arm having a sector gear at its pivotal end, a gear wheel engaging said sector gear, a shaft upon which the gear wheel is mounted, a power driven second shaft, a wheel loosely mounted thereon, and operative connections between the first named shaft and said last named wheel for transmitting power from one to the other, and a clutch for operatively connecting the second named wheel to the shaft or disconnecting it therefrom.

15. In a transporting apparatus, a traveling supporting structure having a series of uprights, laterally spaced from each other to admit the body to be supported between the uprights, beams pivoted to said uprights for movement in a vertical plane and normally disposed in a horizontal position and engaging the opposite uprights, pulleys mounted on each of said beams, cables passing over said pulley, said supporting beams being arranged in pairs, those supporting members at the outer and inner ends of the supporting structure constituting one pair and the supporting beams on the next adjacent set of uprights constituting another pair, and so on, means for simultaneously taking up or paying out the cables connected to and supported by any pair of supporting beams, and means for oscillating any pair of supporting beams including a plurality of shafts, one for each pair of supporting beams, the shaft having a length equal to the distance between each pair of supporting beams, means operatively connecting the ends of each shaft to the corresponding supporting beams to cause the oscillation of the supporting beams upon the rotation of the shaft, sprocket wheels on each shaft, a driving shaft, sprocket wheels loosely mounted thereon and operatively connected to the sprocket wheels on the first named shafts, and clutches, one for each of the second named sprocket wheels whereby any one sprocket wheel may be engaged with the driving shaft or disengaged therefrom independently of any other sprocket wheel.

16. Means for transporting a boat from one body of water to another body of water at a different level including an inclined track extending from a point adjacent the water at the higher level into the lower body of water, an inclined track extending downward into the upper body of water, a traveling supporting structure mounted to travel on said tracks and become partially submerged in said bodies of water, means for transferring the traveling structure from the upper end of one track to the upper end of the other including a transfer structure swinging in a horizontal plane and having tracks inclined at the same angle as the angle of the first and second named tracks and registrable therewith, arcuate rails upon which the transfer structure turns, a latch automatically locking the transfer structure with its rails in alinement with the rails of either of the inclined tracks, manually operable means for releasing said latch, a winding drum carried upon the transfer structure, a cable wound on said winding drum and engaged with the traveling structure, power operated means for rotating the winding drum in either direction, and power operated means for propelling the transfer structure around said arcuate tracks.

17. Means for transporting a boat from one body of water to another body of water at a different level including an inclined track extending from a point adjacent the water at the higher level into the lower body of water, an inclined track extending downward into the upper body of water, a traveling supporting structure mounted to travel on said tracks and become partially submerged in said bodies of water, means for transferring the traveling structure from the upper end of one track to the upper end of the other, a pier mounted upon the upper level and having convergently disposed sides, a vertical pintle operatively supported by said pier at its apex, a transfer structure swingingly mounted on said pintle for oscillation in a horizontal plane and having inclined tracks having the same inclination as the first and second named inclined tracks and adapted to form continuations thereof, manually releasable means for holding the transfer structure with its tracks in alinement with the first and second named tracks, a winding drum mounted on the transfer structure, a cable engaging therewith and engaged with the traveling structure, a motor carried by the transfer structure, means for operatively connecting the motor to the winding drum to cause it to turn in either direction, an arcuate rack, a gear wheel engaging the rack and mounted on the transfer structure, and power operated means for rotating said gear wheel to thereby cause the traverse of the transfer structure from one track to the other.

In testimony whereof I hereunto affix my signature.

JOHANN J. R. HAALCK.